US008877380B2

(12) United States Patent
Lee et al.

(10) Patent No.: US 8,877,380 B2
(45) Date of Patent: Nov. 4, 2014

(54) POSITIVE ACTIVE MATERIAL, METHOD OF PREPARING THE SAME, AND LITHIUM BATTERY INCLUDING THE POSITIVE ACTIVE MATERIAL

(75) Inventors: Hyun-Deok Lee, Yongin-si (KR);
Yong-Chul Park, Yongin-si (KR);
Mi-Ran Song, Yongin-si (KR);
Na-Leum Yoo, Yongin-si (KR);
Jin-Hyoung Seo, Yongin-si (KR);
Min-Ju Kim, Yongin-si (KR);
Gyeong-Jae Heo, Yongin-si (KR);
Jae-Dong Byun, Seoul (KR); Sun-Youn Ryou, Cheonan-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 163 days.

(21) Appl. No.: 13/196,251

(22) Filed: Aug. 2, 2011

(65) Prior Publication Data
US 2012/0064411 A1  Mar. 15, 2012

(30) Foreign Application Priority Data

Sep. 13, 2010  (KR) ........................ 10-2010-0089457

(51) Int. Cl.
 H01M 4/00 (2006.01)
 H01M 4/13 (2010.01)
(52) U.S. Cl.
 USPC ........................................ 429/224; 429/218.1
(58) Field of Classification Search
 None
 See application file for complete search history.

(56) References Cited

U.S. PATENT DOCUMENTS

| 5,665,491 | A | * | 9/1997 | Tomiyama et al. | 429/218.1 |
| 7,060,392 | B2 | * | 6/2006 | Kim | 429/340 |
| 2003/0054250 | A1 | * | 3/2003 | Kweon et al. | 429/231.1 |
| 2003/0073004 | A1 | | 4/2003 | Kweon et al. | |
| 2003/0215703 | A1 | | 11/2003 | Cho et al. | |
| 2004/0157126 | A1 | * | 8/2004 | Belharouak et al. | 429/231.8 |
| 2005/0266150 | A1 | | 12/2005 | Yong et al. | |
| 2008/0248396 | A1 | | 10/2008 | Jung et al. | |
| 2009/0104534 | A1 | * | 4/2009 | Kaneko et al. | 429/231.5 |
| 2010/0181540 | A1 | | 7/2010 | Suzuki | |
| 2011/0123865 | A1 | * | 5/2011 | Kepler et al. | 429/220 |

FOREIGN PATENT DOCUMENTS

| JP | 2005-108523 | | 4/2005 |
| JP | 2009-200007 | | 9/2009 |
| JP | 2010-170750 | A | 8/2010 |
| KR | 2003-0032363 | A | 4/2003 |
| KR | 2003-0089750 | A | 11/2003 |
| KR | 1020040096203 | A | 11/2004 |
| KR | 2006-0041649 | A | 5/2006 |
| KR | 1020080010169 | A | 1/2008 |
| KR | 10-2008-0090655 | | 10/2008 |
| KR | 1020080095352 | A | 10/2008 |

OTHER PUBLICATIONS

Machine translation of JP 2009-200007, retrieved from <http://www19.ipdl.inpit.go.jp/PA1/cgi-bin/PA1INIT?1369928322380?> on May 29, 2013.*
Korean Notice of Allowance issued by the Korean Industrial Property Office dated Feb. 17, 2012, 5 pages.

* cited by examiner

*Primary Examiner* — Cynthia K. Walls
(74) *Attorney, Agent, or Firm* — Knobbe, Martens, Olson & Bear, LLP

(57) ABSTRACT

A positive active material, a method of preparing the same, and a lithium secondary battery including the positive active material.

16 Claims, 2 Drawing Sheets

POSITIVE ACTIVE MATERIAL, METHOD OF PREPARING THE SAME, AND LITHIUM BATTERY INCLUDING THE POSITIVE ACTIVE MATERIAL

CROSS-REFERENCE TO RELATED APPLICATIONS

This application claims the benefit of Korean Patent Application No. 10-2010-0089457, filed Sep. 13, 2010, in the Korean Intellectual Property Office, the disclosure of which is incorporated herein by reference.

BACKGROUND

1. Field

One or more embodiments relate to a positive active material, a method of preparing the same, and a lithium secondary battery including the positive active material.

2. Description of the Related Technology

Lithium batteries are a type of secondary batteries that generate electricity by migration of lithium ions between positive and negative electrodes. Lithium secondary batteries typically include positive and negative electrodes, an electrolyte membrane, and a separator. Positive and negative active materials for the positive and negative electrodes may have structures allowing for reversible intercalation and deintercalation of lithium ions to enable lithium batteries to be charged and discharged by the reversible reactions.

Lithium batteries have been widely adopted, along with rapid increase in demand for portable devices such as mobile phones, personal digital assistants (PDAs), and laptop computers, even in the electric vehicle sector. In addition, demand for high-energy density lithium batteries is significantly increasing as the lithium batteries are increasingly miniaturized and having higher performance. While technologies of lithium batteries have been remarkably developed, better performance is still desired. For lithium secondary batteries, various kinds of carbonaceous materials are mostly used for negative electrodes and lithium composite oxides with various metals are mostly used for positive electrodes.

Energy of a lithium secondary battery is mainly dependant on a positive active material thereof. Commercially available small-sized lithium secondary batteries typically use a layer compound of $LiCoO_2$ in a positive electrode thereof and carbon in a negative electrode thereof. $LiCoO_2$ is a material having stable charge/discharge characteristics, good electronic conductivity, high thermal stability, and flat discharge voltage characteristics. However, the reserves of Co are small worldwide, and Co is expensive and toxic to the human body, and thus there is demand for alternative positive materials.

Currently, $LiNiO_2$ and $LiCoxNi_{1-x}O_2$ have been actively researched and developed as positive electrode materials. However, $LiNiO_2$ is difficult to commercialize due to difficulty in synthesis thereof and its poor thermal stability. $LiCoxNi_{1-x}O_2$ also does not have good performance to replace $LiCoO_2$.

Thus, lithium secondary batteries including these positive active materials may have lifetimes that rapidly reduce with repeating charge and discharge. This is attributed to decomposition of electrolytes or deterioration of active materials caused by moisture inside the batteries or other factors, which subsequently increases internal resistance of the batteries. The present embodiments overcome the above problems and provide additional advantages as well.

SUMMARY

One or more embodiments include a positive active material for lithium secondary batteries that has high-temperature storage characteristics and cyclic stability without a degradation in electrochemical characteristics.

One or more embodiments include a method of preparing the positive active material for lithium batteries.

According to one or more embodiments, a positive active material includes: lithium-manganese composite oxide particles represented by Formula 1 below; a porous glass-based inorganic material layer covering surfaces of the lithium-manganese composite oxide particles; and conductive material particles dispersed in pores of the glass-based inorganic material layer:

$$Li_xMn_2O_4 \qquad \text{Formula 1}$$

wherein $0.7<x<1.5$.

According to an aspect of the present embodiments, the lithium-manganese composite oxide particles may include $LiMn_2O_4$.

According to an aspect of the present embodiments, the lithium-manganese composite oxide particles may have an average particle diameter of about 0.5 µm to about 30 µm.

According to an aspect of the present embodiments, an amount of the lithium-manganese composite oxide particles may be from about 90 parts by weight to about 99 parts by weight, based on 100 parts by weight of the sum of the lithium-manganese composite oxide particles and the glass-based inorganic material layer.

According to an aspect of the present embodiments, the glass-based inorganic material layer may include $SiO_2$.

According to an aspect of the present embodiments, the glass-based inorganic material layer may include $Li_2O$, $Al_2O_3$, and $SiO_2$.

According to an aspect of the present embodiments, the glass-based inorganic material layer may include about 5 parts by weight to about 20 parts by weight of $Li_2O$, about 5 parts by weight to about 30 parts by weight of $Al_2O_3$, and about 50 parts by weight to about 90 parts by weight of $SiO_2$, based on 100 parts by weight of the glass-based inorganic material layer.

According to an aspect of the present embodiments, the glass-based inorganic material layer may have a thickness of about 0.1 µm to about 10 µm.

According to an aspect of the present embodiments, an amount of the glass-based inorganic material layer may be from about 1 part by weight to about 10 parts by weight, based on 100 parts by weight of the sum of the lithium-manganese composite oxide particles and the glass-based inorganic material layer.

According to an aspect of the present embodiments, the conductive material particles may include metal powder.

According to an aspect of the present embodiments, the conductive material particles may include metal powder having an average particle diameter of about 0.001 van to about 1 µm.

According to an aspect of the present embodiments, the conductive material particles may include nano iron (Fe) powder.

According to an aspect of the present embodiments, an amount of the conductive material particles may be from about 0.001 parts by weight to about 0.1 parts by weight, based on 100 parts by weight of the sum of the lithium-manganese composite oxide particles and the glass-based inorganic material layer.

According to one or more embodiments, a method of preparing a positive active material includes: forming a glass-based inorganic material layer having pores on the surface of lithium-manganese composite oxide particles represented by Formula 1 below: and dispersing conductive material particles in the pores of the glass-based inorganic material layer:

$$Li_xMn_2O_4 \qquad \text{Formula 1}$$

wherein $0.7<x<1.5$.

According to an aspect of the present embodiments, the forming of the glass-based inorganic material layer having the pores may include quenching at a temperature of about 0° C. to about 50° C.

According to an aspect of the present embodiments, the lithium-manganese composite oxide particles may include $LiMn_2O_4$, the glass-based inorganic material layer may include $SiO_2$, and the conductive material particles may include metal powder, for example, nano Fe powder.

According to one or more embodiments, a lithium secondary battery includes a positive electrode containing the positive active material described above, a negative electrode, and a separator between the positive and negative electrodes.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
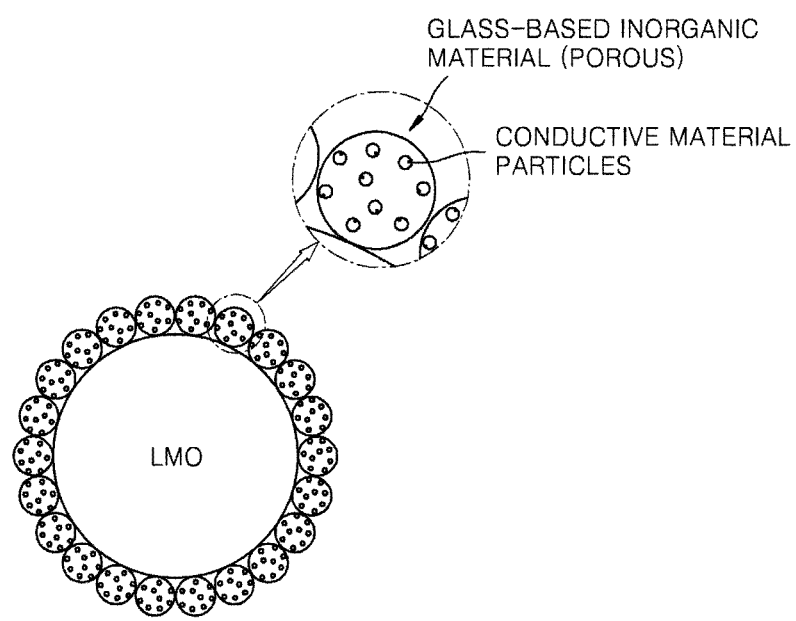
FIG. 1 is a schematic illustration of a positive active material for lithium secondary batteries, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

In the drawings, thicknesses and widths of layers or regions may be exaggerated for clarity.

FIG. 1 is a schematic illustration of a positive active material for lithium secondary batteries, according to an embodiment.

Referring to FIG. 1, the positive active material includes lithium-manganese composite oxide (LMO) particles represented by $Li_xMn_2O_4$ ($0.7<x<1.5$), a porous glass-based inorganic material layer covering the surface of the LMO particles, and conductive material particles stuck to pores of the porous glass-based inorganic material layer.

An example of lithium-manganese composite oxides, which are typically positive active materials for use in lithium secondary batteries, is $LiCoO_2$. $LiCoO_2$, which is relatively expensive, is toxic to the human body and lithium batteries using $LiCoO_2$ have a limited capacity of 140 mAh/g or less. In addition, when $LiCoO_2$ is delithiated into $Li_{1-x}CoO_2$ in an electrode by being charged, the electrode is unstable and not safe for use. $LiCO_{1-x}Ni_xO_2$ as an alternative positive active material to $LiCoO_2$ and obtained by partially substituting Co in $LiCoO_2$ with nickel has better electrochemical characteristics than $LiCoO_2$. However, $LiCo_{1-x}Ni_xO_2$ is still not good in other aspects.

On the contrary, a manganese (Mn)-containing metal oxide system is good in terms of electrochemical potential, cost, capacity, and safety. As a replacement for Co, Mn is a transition metal for use in positive electrodes of lithium secondary batteries of the present embodiments.

A lithium-manganese composite oxide may be in any of various forms. In some embodiments, the lithium-manganese composite oxide may be represented by $Li_xMn_2O_4$, wherein $0.7<x<1.5$.

In some embodiments, the lithium-manganese composite oxide may be $LiMn_2O_4$.

Unlike $LiCoO_2$ and $LiNiO_2$, $LiMn_2O_4$ is inexpensive and advantageously not prone to a risk of explosion caused by oxygen generated due to overcharge.

The lithium-manganese composite oxide may have an average particle diameter of about 0.5 μm to about 30 μm, and in some embodiments, an average particle diameter of about 5 nm to about 20 nm.

When the average particle diameter of the lithium-manganese composite oxide is within these ranges, good high-temperature characteristics and cycle characteristics may be obtained.

An amount of the lithium-manganese composite oxide particles may be determined to make up the rest of the total weight of the positive active material excluding the amounts of the glass-based inorganic material layer and the conductive material particles. In some embodiments, the amount of the lithium-manganese composite oxide particles may be from about 90 parts by weight to about 99 parts by weight, based on 100 parts by weight of the sum of the lithium-manganese composite oxide particles and the glass-based inorganic material layer. When the amount of the lithium-manganese composite oxide particles is within this range, intercalation and deintercalation of lithium ions may be facilitated.

When lithium-manganese composite oxides contact an electrolyte used as an ion conduction medium in a lithium secondary battery, Mn may diffuse out of the lithium-manganese composite oxides into the electrolyte, which may then deteriorate charge and discharge cycle characteristics of the lithium secondary battery.

Using solid electrolytes (film or foil form), instead of liquid electrolytes, may prevent the outdiffusion of Mn into the electrolyte, thereby suppressing a reduction in discharge capacity. However, ion conductivity in solid electrolytes is not as good as that in liquid electrolytes, and a contact area between a solid electrolyte and an electrode is also smaller than when using a liquid electrolyte. Thus, discharge capacity, in particular, during a high-rate discharge, is reduced. Using a gel-type polymer electrolyte manufactured by impregnating a polymer matrix with a liquid electrolyte consisting of a solute (electrolyte salt) and a solvent may suppress the outdiffusion of Mn into the liquid electrolyte. However, a contact area between the gel-type polymer electrolyte and an electrode is still smaller than when using a liquid electrolyte, and thus discharge capacity is as low as when a solid electrolyte is used.

Thus, physically blocking contact between a lithium-manganese composite oxide and an electrolyte may be considered. One of a variety of ways to physically block contact between a lithium-manganese composite oxide and an electrolyte is to coat surfaces of the lithium-manganese composite oxide particles with a material. Though it is impractical to fully coat the surfaces of the lithium-manganese composite oxide particles, it may be ideal to substantially fully coat the surfaces of the lithium-manganese composite oxide particles.

The positive active material for lithium secondary batteries according to embodiments includes a glass-based inorganic material layer coating the surfaces of the lithium-manganese composite oxide particles. In this regard, the glass-based inorganic material refers to an inorganic material in which at least 50% (by weight) of the inorganic material is $SiO_2$. The glass-based inorganic material layer has characteristics that are advantageous for substantially fully coating the surfaces of the lithium-manganese composite oxide.

The glass-based inorganic material layer may include $SiO_2$. In some embodiments, the glass-based inorganic material layer may include $Li_2O$, $Al_2O_3$, and $SiO_2$.

If the surfaces of the lithium-manganese composite oxide particles are coated with only the glass-based inorganic material, low lithium ion conductivity or electrical conductivity may be obtained, which lowers characteristics for a positive electrode material. Thus, the glass-based inorganic material layer may have a high lithium ion conductivity composition. In some embodiments, when the glass-based inorganic material layer includes $Li_2O$, $Al_2O_3$, and $SiO_2$, the glass-based inorganic material layer may have good lithium ion conductivity.

In some embodiments, the glass-based inorganic material layer may include about 5 parts by weight to about 20 parts by weight of $Li_2O$, about 5 parts by weight to about 30 parts by weight of $Al_2O_3$, and about 50 parts by weight to about 90 parts by weight of $SiO_2$ based on the glass-based inorganic material layer. When the amounts of $Li_2O$, $Al_2O_3$, and $SiO_2$ are within these ranges, the lithium ion conductivity of the positive active material may be good.

In some embodiments, the glass-based inorganic material layer includes pores. Though the lithium ion conductivity of the glass-based inorganic material layer may be improved by using the inorganic materials in the composition ranges defined above, the lithium ion conductivity of the glass-based inorganic material layer is still low for the lithium-manganese composite oxide covered by the glass-based inorganic material layer and used as a positive active material. However, the lithium ion conductivity may be improved by creating pores in the glass-based inorganic material layer.

The glass-based inorganic material layer may have a thickness of about 0.1 to about 10 μm. When the thickness of the glass-based inorganic material layer is within this range, the lithium ion conductivity of the positive active material may be good.

An amount of the glass-based inorganic material layer may be from about 1 part by weight to about 10 parts by weight, based on 100 parts by weight of the sum of the lithium-manganese composite oxide particles and the glass-based inorganic material layer. When the amount of the glass-based inorganic material layer is about 1 part by weight or greater, there is enough of the glass-based inorganic material layer to fully coat the surfaces of the lithium-manganese composite oxide so as to physically block contact with an electrolyte. When the amount of the glass-based inorganic material layer is 10 parts by weight or less, reduction of the lithium ion conductivity may be substantially prevented.

Conductive material particles may be dispersed in the pores of the glass-based inorganic material layer. The conductive material particles may be metal powder.

The glass-based inorganic material layer may lower electrical conductivity of a positive electrode. In order to improve low-electrical conductivity characteristics of the glass-based inorganic material layer, high-electrical conductivity particles may be incorporated into the glass-based inorganic material layer. Examples of high-electrical conductivity materials are metals in powder form.

The conductive material particles may be metal powder having an average particle diameter of about 0.001 μm to about 1 μm. When the average particle diameter of the conductive material particles is about 0.001 μm or greater, the conductive material particles may be smoothly dispersed without coagulating. When the average particle diameter of the conductive material particles is 1 μm or less, its relative proportion in a positive electrode may be not too high as to lower capacity of a battery. In some embodiments, the conductive material particles may be metal powder having an average particle diameter of about 1 nm to about 500 nm.

In some embodiments, the conductive material particles may be nano iron powder.

The amount of the conductive material particles may vary depending on the amount of pores in the glass-based inorganic material layer, and is not particularly limited, and may be in a range for an improvement in electrical conductivity of the lithium-manganese composite oxide coated with the glass-based inorganic material layer. Even when used in an excess amount, the conductive material particles remaining uninserted into the pores may serve as a conductive agent for the positive electrode plate, thus contributing to electrical conductivity. In some embodiments, the amount of the conductive material particles may be from about 0.001 part by weight to about 0.1 parts by weight, based on 100 parts by weight of the sum of the lithium-manganese composite oxide particles and the glass-based inorganic material layer. For examples, the amount of the conductive material particles may be from about 0.001 parts by weight to about 0.05 parts by weight, and in some other embodiments, may be from about 0.001 parts by weight to about 0.005 parts by weight, based on 100 parts by weight of the sum of the lithium-manganese composite oxide particles and the glass-based inorganic material layer.

A positive electrode including the positive active material containing the materials described above may have good electrochemical characteristics and improved Mn outdiffusion characteristics.

According to an embodiment, a method of preparing the positive active material includes: forming a glass-based inorganic material layer including pores on the surfaces of lithium-manganese composite oxide particles represented by Formula 1 above; and dispersing conductive material particles in the pores.

In preparing the positive active material, first, the lithium-manganese composite oxide particles of Formula 1 and a glass-based inorganic material may be mixed to form a mixture, thermally treated, and then quenched to obtain the glass-based inorganic material layer with the pores on the surfaces of the lithium-manganese composite oxide particles. In some embodiments, the glass-based inorganic material layer with the pores on all surfaces of the lithium-manganese composite oxide may be formed by thermally treating the mixture at a relatively high temperature and quenching to a lower temperature. The quenching temperature may be from about 0° C. to about 50° C. When the quenching temperature is within this range, this may allow the mixture to be overcooled in such a way as to have suitable pores in the glass-based inorganic material layer.

Next, the conductive material particles are dispersed in the pores. In some embodiments, the lithium-manganese composite oxide particles coated with the porous glass-based inorganic material layer may be put into a solution of conductive material particles to allow the conductive material particles to permeate into the pores of the glass-based inorganic material layer. Next, the conductive material particles dispersed in the pores of the glass-based inorganic material layer are fixed. In some embodiments, after the conductive material particles are dispersed into the pores of the glass-based inorganic material layer, the conductive material particles may be fixed to the glass-based inorganic material layer by thermal treatment.

In the method of preparing the positive active material, for example, the lithium-manganese composite oxide particles may include $LiMn_2O_4$ particles, the glass-based inorganic material layer may include $Li_2O$, $Al_2O_3$ and $SiO_2$, and the conductive material particles may include metal powder.

The positive active material prepared according to the method described above may be mixed with a binder, a conducting agent, and a solvent to prepare a composition for forming a positive active material layer.

According to an embodiment, a lithium secondary battery includes a positive electrode, a negative electrode, and a separator between the positive and negative electrodes, wherein the positive electrode includes the positive active material according to embodiments.

A method of manufacturing a lithium secondary battery will now be described.

The lithium secondary battery includes a positive electrode, a negative electrode, a lithium salt-containing non-aqueous electrolyte, and a separator.

The positive electrode may be manufactured by coating a composition for forming a positive active material layer on a positive current collector, and drying the composition to obtain the positive active material layer, wherein the composition includes a positive active material, a conducting agent, a binder, and a solvent.

The positive active material used herein is the positive active material described above, and thus a detailed description thereof will not be recited here.

The positive electrode current collector may be fabricated to have a thickness of about 3 μm to about 500 μm. However, any current collector may be used as long as it has high conductivity without causing chemical changes in the battery. Examples of the positive electrode current collector are stainless steel, aluminum, nickel, titanium, sintered carbon, and aluminum or stainless steel that is surface-treated with carbon, nickel, titanium, or silver. The positive electrode current collector may be processed to have fine irregularities on surfaces thereof so as to enhance adhesive strength of the current collector to the positive active material. The positive electrode current collector may be in any of various forms including films, sheets, foils, nets, porous structures, foams, and non-woven fabrics.

The binder helps bind the positive active material and the conducting agent together and helps bind them to the current collector. An amount of the binder may be from about 1 wt % to about 50 wt %, based on the total weight of the positive active material layer composition including the positive active material. Examples of the binder are polyvinylidene fluoride (PVDF), polyvinyl alcohols, carboxymethylcellulose (CMC), starch, hydroxypropylcellulose, regenerated cellulose, polyvinylpyrollidone, tetrafluoroethylene, polyethylene, polypropylene, ethylene-propylene-diene terpolymer (EPDM), sulfonated EPDM, styrene butadiene rubber, fluoro rubber, and various copolymers. An amount of the binder may be from about 2 parts by weight to about 10 parts by weight, based on 100 parts by weight of the positive active material. When the amount of the binder is within this range, the positive active material layer may bind strongly to the current collector.

The conducting agent is not particularly limited, and may be any material so long as it has suitable conductivity without causing chemical changes in the lithium secondary battery. Examples of the conductive material are graphite such as natural or artificial graphite; carbon blacks such as acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives. An amount of the conducting agent may be from about 2 parts by weight to about 10 parts by weight, based on 100 parts by weight of the positive active material. When the amount of the conducting agent is within this range, the positive electrode may have high conductivity.

The solvent may be N-methylpyrrolidone (NMP). An amount of the solvent may be from about 70 parts by weight to about 120 parts by weight, based on 100 parts by weight of the positive active material. When the amount of the solvent is within this range, a process for forming the positive active material layer may be facilitated.

The negative electrode may be manufactured by coating a composition for forming a negative active material layer on a negative current collector, and drying the composition to obtain the negative active material layer.

The composition for forming the negative active material layer may be prepared by mixing a negative active material including a carbonaceous material with a binder and a solvent.

In general, the negative current collector is fabricated to have a thickness of about 3 μm to about 500 μm. The negative current collector is not particularly limited, and may be any material as long as it has suitable conductivity without causing chemical changes in the fabricated battery. Examples of the negative current collector are copper, stainless steel, aluminum, nickel, titanium, sintered carbon, copper or stainless steel that is surface-treated with carbon, nickel, titanium or silver, and aluminum-cadmium alloys. In addition, the negative current collector may be processed to have fine irregularities on surfaces thereof so as to enhance adhesive strength of the current collector to the negative active material, and may be used in any of various forms including films, sheets, foils, nets, porous structures, foams, and non-woven fabrics.

As the negative active material, a carbonaceous material may be used alone or in a combination with other negative active materials that are commonly used in lithium secondary batteries.

The conducting agent and the binder for forming the negative electrode may be the same kinds and may be used in the same amounts as those for the positive electrode.

The solvent may be N-methylpyrrolidone (NMP). The amount of the solvent may be from about 70 to about 120 parts by weight, based on 100 parts by weight of the negative active material. When the amount of the solvent is within this range, a process for forming the negative active material layer may be facilitated.

A separator may be disposed between the positive and negative electrodes manufactured according to the processes described above.

The separator may have a pore diameter of about 0.01 μm to about 10 μm and a thickness of about 5 μm to about 300 μm. Examples of the separator are olefin-based polymers, such as polypropylene, and sheets or non-woven fabric made of glass fiber or polyethylene.

The lithium salt-containing non-aqueous electrolyte is composed of a non-aqueous electrolyte solution and a lithium salt. The non-aqueous electrolyte may be a non-aqueous liquid electrolyte, an organic solid electrolyte, or an inorganic solid electrolyte.

Examples of the non-aqueous liquid electrolyte are any of aprotic organic solvents such as N-methyl-2-pyrrolidone, propylene carbonate, ethylene carbonate (EC), butylene carbonate, dimethyl carbonate, diethyl carbonate (DEC), fluoroethylene carbonate (FEC), γ-butyrolactone, 1,2-dimethoxyethane, tetrahydroxyfuran, 2-methyl tetrahydrofuran, dimethylsulfoxide, 1,3-dioxolane, formamide, dimethylformamide, acetonitrile, nitromethane, methyl formate, methyl acetate, phosphoric acid trimester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte are polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte are nitrides, halides and sulfates of lithium such as $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be any lithium salt that is soluble in the above-mentioned non-aqueous electrolyte. Examples of the lithium salt are $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3L_1$, $CF_3SO_3Li$, $(CF_3SO_2)_2NLi$, lithium chloroborate, lower aliphatic carboxylic acid lithium, lithium tetraphenyl borate, and imide.

The present embodiments will now be described with reference to the following examples. These examples are for illustrative purposes only and are not intended to limit the scope of the one or more embodiments.

EXAMPLE 1

Preparation of Positive Active Material

A glass-based inorganic material including $Li_2O$, $Al_2O_3$, and $SiO_2$ in a weight ratio of 15:25:60, and $LiMn_2O_4$ were mixed in a weight ratio of 5:100 to obtain a mixture. The mixture was thermally treated at about 800° C. and quenched to about 30° C. to coat surfaces of lithium-manganese composite oxide particles with a porous glass-based inorganic material layer. The porous glass-based inorganic material layer had a porosity (a percent void fraction) of about 30%, as measured using a common porosity measuring instrument (weighing method). The lithium-manganese composite oxide particles coated with the porous glass-based inorganic material layer were put into a nano iron (Fe) powder dispersion to permeate the nano Fe powder into the pores of the porous glass-based inorganic material layer. Then, the resulting mixture was dried. The dried nano Fe-containing mixture was thermally treated at about 500° C. to obtain a positive active material embedded with the nano Fe powder. The nano Fe was about 0.5% by weight of the positive active material, which was measured by weighing the positive active material before and after the permeation of the nano Fe powder.

Manufacture of Lithium Secondary Battery

The positive active material prepared as described above, Super P (a conducting agent), Solef (PVdF polyvinylidene fluoride, a binder), and NMP (a solvent) were mixed in a weight ratio of 92:4:4:100 to prepare a slurry (a composition for forming a positive active material layer). The slurry was coated on an aluminum (Al) current collector and dried to obtain a positive electrode. A lithium secondary battery was manufactured using the positive electrode, according to a method commonly used in the art.

COMPARATIVE EXAMPLE 1

Preparation of Positive Active Material

A metal oxide including $ZrO_2$, $TiO_2$, $WO_3$, $B_2O_3$, and $Al_2O_3$ in a weight ratio of 10:10:10:40:30, and $LiMn_2O_4$ were mixed in a weight ratio of 5:100 to obtain a mixture. The mixture was thermally treated at about 800° C. and quenched to about 30° C. to coat surfaces of lithium-manganese composite oxide particles with a porous material layer. The porous material layer had a porosity (a percent void fraction) of about 30%, as measured using a common porosity measuring instrument (weighing method). The lithium-manganese composite oxide particles coated with the porous material layer were put into a nano iron (Fe) powder dispersion to permeate the nano Fe powder into the pores of the porous material layer. Then, the resulting mixture was dried. The dried nano Fe-containing mixture was thermally treated at about 500° C. to obtain a positive active material embedded with the nano Fe powder.

Manufacture of Lithium Secondary Battery

A lithium secondary battery was manufactured in the same manner as in Example 1, except that the positive active material prepared as described above in Comparative Example 1 was used.

COMPARATIVE EXAMPLE 2

Preparation of Positive Active Material

A glass-based inorganic material including $Li_2O$, $Al_2O_3$, and $SiO_2$ in a weight ratio of 15:25:60, and $LiMn_2O_4$ were mixed in a weight ratio of 5:100 to obtain a mixture. The mixture was thermally treated at about 800° C. and cooled down slowly to obtain a positive active material including lithium-manganese composite oxide particles surface-coated with a glass-based inorganic material layer. The resulting positive active material did not have pores.

Manufacture of Lithium Secondary Battery

A lithium secondary battery was manufactured in the same manner as in Example 1, except that the positive active material prepared as described above in Comparative Example 2 was used.

Retention capacity and recovery capacity of each of the lithium secondary batteries of Example 1 and Comparative Examples 1 and 2 were measured after storage at about 60° C. for a month. Cyclabilities after 100 cycles at 60° C. and 1 C rate, and amounts of Mn out-diffusion after storage in a 60° C. liquid electrolyte for a week were also measured. The results are shown in Table 1 and FIG. 2.

TABLE 1

| | Retention capacity/ Recovery capacity | Cyclability | Amount of Mn out-diffusion |
|---|---|---|---|
| Example 1 | 75%/98% | 96% | 5 ppm |
| Comparative Example 1 | 65%/92% | 90% | 126 ppm |
| Comparative Example 2 | 57%/88% | 84% | 5 ppm |

Figure 2:
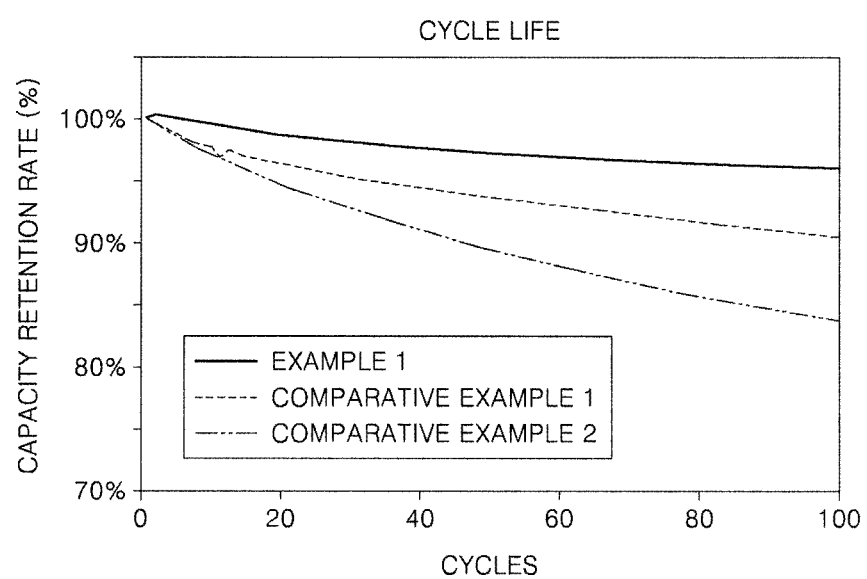
FIG. 2 is a graph illustrating cyclabilities of lithium secondary batteries manufactured according to Example 1 and Comparative Examples 1 and 2.

Referring to Table 1 and FIG. 2, the lithium secondary battery of Example 1 has higher retention capacity and recovery capacity than the lithium secondary batteries of Comparative Examples 1 and 2, and has a lower amount of Mn out-diffusion than the lithium secondary battery of Comparative Example 1.

This indicates that the lithium secondary battery of Example 1, including the positive electrode according to embodiments, has good high-temperature storage characteristics and cyclic stability without a degradation in electrochemical characteristics.

As described above, according to the one or more above embodiments, a lithium secondary battery using a positive electrode including a positive active material according to embodiments, has good high-temperature storage characteristics and cyclic stability without a degradation in electrochemical characteristics.

It should be understood that the example embodiments described herein should be considered in a descriptive sense only and not for purposes of limitation. Descriptions of features or aspects within each embodiment should typically be considered as available for other similar features or aspects in other embodiments.

What is claimed is:

1. A positive active material comprising:
lithium-manganese composite oxide particles represented by Formula 1 below;
a porous glass-based inorganic material layer covering surfaces of the lithium-manganese composite oxide particles; and
metal particles dispersed in pores of the glass-based inorganic material layer,
wherein the glass-based inorganic material layer comprises at least 50 weight percent of $SiO_2$ based on the total weight of the glass-based inorganic material layer:

$$Li_xMn_2O_4 \qquad \text{Formula 1}$$

wherein $0.7 < x < 1.5$.

2. The positive active material of claim 1, wherein the lithium-manganese composite oxide particles comprise $LiMn_2O_4$.

3. The positive active material of claim 1, wherein the lithium-manganese composite oxide particles have an average particle diameter of about 0.5 µm to about 30 µm.

4. The positive active material of claim 1, wherein an amount of the lithium-manganese composite oxide particles is from about 90 parts by weight to about 99 parts by weight, based on 100 parts by weight of the sum of the lithium-manganese composite oxide particles and the glass-based inorganic material layer.

5. The positive active material of claim 1, wherein the glass-based inorganic material layer comprises $Li_2O$, $Al_2O_3$, and $SiO_2$.

6. The positive active material of claim 5, wherein the glass-based inorganic material layer comprises about 5 parts by weight to about 20 parts by weight of $Li_2O$, about 5 parts by weight to about 30 parts by weight of $Al_2O_3$, and about 50 parts by weight to about 90 parts by weight of $SiO_2$, based on 100 parts by weight of the glass-based inorganic material layer.

7. The positive active material of claim 1, wherein the glass-based inorganic material layer has a thickness of about 0.1 µm to about 10 µm.

8. The positive active material of claim 1, wherein an amount of the glass-based inorganic material layer is from about 1 part by weight to about 10 parts by weight, based on 100 parts by weight of the sum of the lithium-manganese composite oxide particles and the glass-based inorganic material layer.

9. The positive active material of claim 1, wherein the conductive material particles comprise metal powder.

10. The positive active material of claim 9, wherein the conductive material particles comprise metal powder having an average particle diameter of about 0.001 µm to about 1 µm.

11. The positive active material of claim 9, wherein the conductive material particles comprise nano iron (Fe) powder.

12. The positive active material of claim 1, wherein an amount of the conductive material particles is from about 0.001 parts by weight to about 0.1 parts by weight, based on 100 parts by weight of the sum of the lithium-manganese composite oxide particles and the glass-based inorganic material layer.

13. A lithium secondary battery comprising a positive electrode, a negative electrode, and a separator between the positive and negative electrodes, wherein the positive electrode comprises the positive active material of claim 1.

14. The lithium secondary battery of claim 13, wherein the glass-based inorganic material layer comprises $Li_2O$, $Al_2O_3$, and $SiO_2$.

15. The lithium secondary battery of claim 14, wherein the glass-based inorganic material layer comprises about 5 parts by weight to about 20 parts by weight of $Li_2O$, about 5 parts by weight to about 30 parts by weight of $Al_2O_3$, and about 50 parts by weight to about 90 parts by weight of $SiO_2$, based on 100 parts by weight of the glass-based inorganic material layer.

16. The lithium secondary battery of claim 13, wherein the conductive material particles comprise metal powder.

* * * * *